April 6, 1943.   E. F. W. ALEXANDERSON   2,315,490
ELECTRIC DRIVE
Filed April 1, 1942
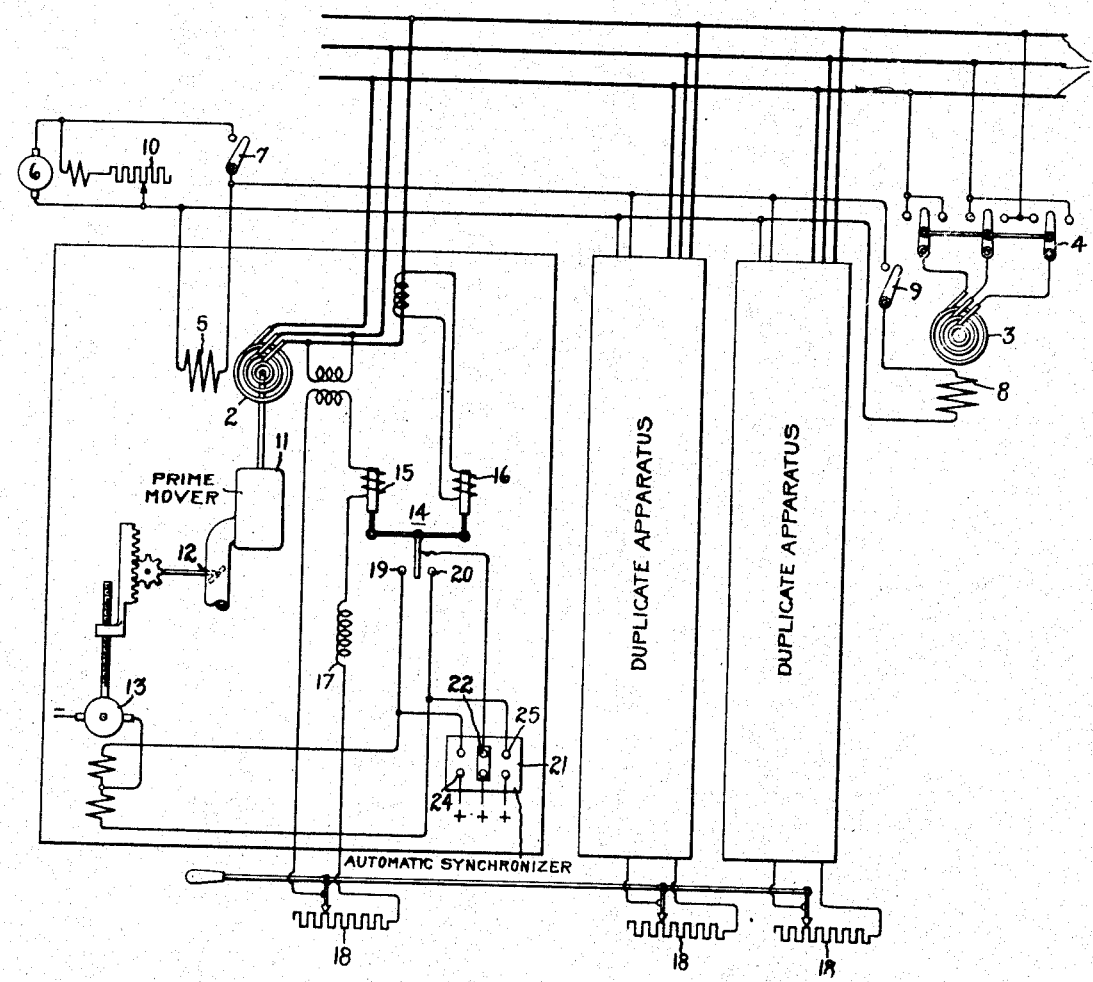
Inventor:
Ernst F. W. Alexanderson,
by Harry E. Dunham
His Attorney.

Patented Apr. 6, 1943

2,315,490

UNITED STATES PATENT OFFICE 2,315,490

ELECTRIC DRIVE

Ernst F. W. Alexanderson, Schenectady, N. Y., assignor to General Electric Company, a corporation of New York Application April 1, 1942, Serial No. 437,238

6 Claims. (Cl. 290—4)

My invention relates to electric drives and more particularly to improvements in electric drives for ship propulsion.

The electric generating portion of electric drives for ship propulsion comprises, in some instances, a plurality of parallel synchronous generators, each of which is driven by its own individual prime mover, such, for example, as a Diesel engine. Heretofore, it had been proposed that each prime mover in such an electric drive be regulated in response to the speed thereof by means of centrifugally operated speed governors so that as the load varies, the speed governors control the respective prime movers to maintain the speeds thereof at desired values. Means are also provided for the operator to adjust the setting of the governors so that the speed, which they maintain constant, may be readily varied. Suitable means are also provided in such drives for automatically synchronizing a generator with the other generators in case it falls out of step and for maintaining the proper division of load between the generators when they are operating in synchronism. Such a control for electric drives, which may be properly called a speed control arrangement, is disclosed and claimed in my copending application, Serial No. 366,322, filed June 6, 1940, and assigned to the same assignee as this application.

In a speed control arrangement of the above-mentioned type, it is desirable, in order to obtain efficient operation, that suitable means be provided for controlling the excitation of each generator so that it is maintained at the minimum value essential for stable operation under all operating conditions. Such a stability-regulating arrangement is disclosed and claimed in U. S. Letters Patent No. 1,461,571 granted July 10, 1923 and assigned by me to the assignee of this application.

The object of my present invention is to provide a new and improved electric drive particularly adapted to ship propulsion, which is not as complicated as the above-mentioned combined speed control and stability-regulating arrangement, but which has all of the advantages thereof.

My improved electric drive may be characterized by saying that it is a torque control arrangement rather than a speed control arrangement. It is analogous to the control of an automobile in which the torque is primarily varied by varying the supply of fuel to the engine, and the desired speed is attained as a secondary effect. For example, when an automobile is going up a hill, the engine has to develop more torque in order to maintain a given speed. Similarly, in a ship propulsion system, more torque has to be developed by the prime mover in order to maintain a given speed under varying load conditions, as is the case when there is a high sea or when the ship's course is changed.

In accordance with my invention, I control the torque of a prime mover driving a synchronous generator so that the torque of the prime mover is automatically adjusted to maintain a predetermined relation between the actual output of the generator and the maximum output obtainable from the generator with the same field excitation. By automatically controlling the torque of a prime mover in this manner, an operator can maintain a constant speed of the electric drive under varying load conditions or can adjust the speed to any desired value under constant or varying load conditions merely by controlling the excitation of the synchronous machines.

There are disclosed in the prior art various types of stability indicating or torque margin relays which respond to predetermined electric conditions of a synchronous machine so that the position of the relay is an indication of the relationship existing between the actual output of the machine and the maximum output or pull-out torque obtainable therefrom with the same field excitation. The aforesaid Letters Patent No. 1,461,571 discloses and claims such a relay per se and its use in connection with an arrangement for controlling the excitation of a synchronous machine so as to maintain a desired relationship between the actual and pull-out torques of the machine. In my present invention, however, a torque margin relay is used to control directly the torque of the prime mover instead of the field excitation of the synchronous machine which, in my present arrangement, is controlled directly by the operator.

My invention will be better understood from the following description when taken in connection with the accompanying drawing, the single figure of which diagrammatically illustrates an electric drive for ship propulsion embodying my invention, and the scope of my invention will be pointed out in the appended claims.

In the electric drive shown in the drawing, I represents a main polyphase power circuit across which are connected a plurality of synchronous generators 2 and a synchronous motor 3. A reversing switch 4 is provided for controlling the connections between the motor 3 and the circuit 1. In order to simplify the drawing and to avoid mere duplication, I have diagrammatically shown enclosed in a rectangle one of the generators 2 and its driving and individual control apparatus in detail, and have represented the other generators 2 and their respective driving and control apparatus by similar rectangles labeled "duplicate apparatus."

Each of the synchronous generators 2 is provided with a direct current field winding 5, which is energized from a suitable source of direct current, such, for example, as a common exciter 6. A suitable switch 7 is provided for selectively controlling the connection of all of the field windings 5 to the exciter 6. The synchronous motor 3 is also provided with a direct current winding 8, which is arranged to be connected to the exciter 6 by a suitable switch 9. An adjustable rheostat 10 is provided in the shunt field circuit of the exciter 6 for varying the voltage thereof.

The generators 2 are separately driven by suitable prime movers 11, such, for example, as Diesel engines. Each prime mover 11 has a throttle 12, which is controlled by a separate reversible motor 13, shown as a direct current motor.

Each throttle controlling motor 13 is individually controlled by a torque margin relay 14, of any suitable type, which is so connected that its position is an indication of the relationship existing between the actual output of the generator and the maximum output obtainable therefrom with the same fluid excitation without the generator falling out of step. In the particular embodiment shown in the drawing, I have disclosed a torque margin relay of the type disclosed and claimed in the aforesaid Letters Patent No. 1,461,561. This relay is a differential relay having two opposing coils 15 and 16 respectively energized in response to the voltage and current of the associated generator 2 so that the relay responds to a predetermined ratio between the current and voltage and independently of any changes in the frequency of the associated generator. This result is accomplished by making the current responsive element 16 operate directly in response to variations in the current and by making the voltage responsive element 15 operate directly in response to the voltage and inversely in response to the frequency by connecting a large inductance 17 in series with the winding of the voltage element. Suitable means, such as a resistor 18 in the circuit of each of the voltage elements 15, may be provided for varying the ratio between the current and voltage to which each relay 14 responds. Each relay 14 is provided with contacts 19, which are closed to complete a circuit for the reversible motor 13 so that it rotates in a direction to operate the associated throttle 12 to effect a decrease in the torque of the associated prime mover 11 when the torque of the voltage element 15 exceeds the torque of the current element 16 and is provided with contacts 20, which are closed to complete a circuit for the reversible motor 13 so that it rotates in the opposite direction and effects an adjustment of the throttle 12 so as to increase the torque of the associated prime mover 11 when the torque of the voltage element 15 is less than the torque of the current element 16.

Any suitable means, examples of which are well known in the art, may be provided for automatically controlling each throttle 12 when the associated generator 2 is operating asynchronously with respect to the other generators of the system so as to bring the asynchronously operating generator back into synchronism. In my copending application, Serial No. 437,239, filed April 1, 1942, and assigned to the same assignee as this application, I have disclosed and claimed an automatic synchronizing arrangement which is particularly adapted for use with an electric drive embodying my present invention. However, since the details of the automatic synchronizing arrangement form no part of my present invention, I have represented such automatic synchronizing means merely by a rectangle 21 containing the contacts 22, which are closed when the associated generator 2 is in synchronism with the other generators, the contacts 24 which are closed to complete a circuit for the associated throttle controlling motor 13 so that it effects a decrease in the torque of the associated prime mover 11 when the generator is operating supersynchronously with respect to the other generators, and the contacts 25 which are closed to complete a circuit for the associated throttle controlling motor 13 so that it effects an increase in the torque of the associated prime mover 11 when the generator is operating subsynchronously with respect to the other generators. The contacts 22 are connected in series with the contacts 19 and 20 of the associated torque margin relay 14 so that this relay can control the operation of the associated prime mover 11 only when the associated generator is operating in synchronism with the other generators.

The operation of the embodiment of my invention shown in the drawing may be understood from the following consideration. With any given motor load and a given adjustment of the exciter field rheostat 10 and of the rheostats 18, each torque margin relay 14 controls its associated prime mover 11 so as to maintain a predetermined relationship, dependent upon the adjustment of the associated rheostat 18, between the voltage and current of the associated generator 2. As is well known to those skilled in the art, this predetermined relationship between the generator voltage and current corresponds to a similar relationship between the actual torque and the maximum torque that the associated generator can develop with the same field excitation without pulling out of step.

Any increase in the motor load, while the adjustments of the rheostats 10 and 18 remain fixed, results in a momentary decrease in the speed of each prime mover 11 and its associated generator 2 so that voltage of each generator 2 decreases relative to the current output thereof. This change in the relative values of the voltage and the current output of each generator 2 causes the contacts 20 of the associated torque margin relay 14 to close and complete a circuit for the associated throttle controlling motor 13 to effect an increase in the torque and speed of the associated prime mover 11 and generator 2. Since the impedance of the motor 3 increases substantially in proportion to the frequency of the current supplied thereto, the increase in speed brought about by the operation of the associated torque margin relay 14 results in an increase in the generator voltage without a material change in the generator current. Consequently, as soon as the generator speed has increased to a sufficient value to cause the torque produced by the voltage winding 15 of the associated torque margin relay to balance the torque produced by the current winding 16, the relay opens its contacts 20 and prevents any further increase in the torque and speed of the associated prime mover 11 and generator 2.

Any decrease in the motor load, while the adjustments of the rheostats 10 and 18 remain fixed, results in a momentary increase in the speed of each prime mover 11 and its associated generator 2 so that the voltage of each generator increases relative to the current output thereof. This change in the relative values of the voltage and the current output of each generator 2 causes the associated torque margin relay 14 to close its contacts 19 and effect a decrease in the torque and speed of the associated prime mover 11 and generator 2 until the voltage of the generator has been reduced to a sufficient value to cause the associated relay 14 to open its contacts 19.

Whenever the operator desires to change the speed of the electric drive, he merely has to adjust the exciter field rheostat 10 in such a manner as to increase the exciter voltage when he wants to increase the speed of the drive and to decrease the exciter voltage when he wants to decrease the speed of the drive.

When the operator effects an increase in the exciter voltage, the electric torque of each generator 2 is increased so that a momentary decrease in the speed of the associated prime mover 11 occurs which causes the voltage of each generator to decrease relative to the current output thereof. This change in the relative values of the voltage and current of each generator causes the contacts 20 of the associated torque margin relay 14 to close and effect, in the manner heretofore described, an increase in the torque and speed of the associated prime mover until a speed is reached when the torques of the prime mover and the associated generator 2 are equal, at which time voltage and current of the generator are such as to cause the associated torque margin relay 14 to open its contacts 20.

Similarly when the operator adjusts the rheostat 10 so as to effect a decrease in the exciter voltage, the electric torque of each generator 2 is decreased so that a momentary increase in the speed of the associated prime mover 11 occurs which causes the voltage of each generator to increase relative to the current output thereof. This change in the relative values of the voltage and current of each generator causes the contacts 19 of the associated torque margin relay 14 to close and effect in the manner heretofore described a decrease in the torque and speed of the associated prime mover until a speed is reached when the torques of the prime mover and the associated generator are equal, at which time the voltage and current of each generator are such as to cause the associated torque margin relay 14 to open its contacts 19.

It will be apparent that the margin between the actual torque and the maximum torque to which the relays 14 respond may be readily varied by adjusting the rheostats 18.

In the event that any generator 2 for any reason falls out of step with the rest of the system, the associated automatic synchronizer 21 operates in a manner well known in the art to close its contacts 24 and effect a decrease in the speed of the associated prime mover 11 when the generator is operating supersynchronously and to close its contacts 25 and effect an increase in the speed of the associated prime mover 11 when the generator is operating subsynchronously. Since the contacts 22 are closed only when the associated generator 2 is in synchronism with the rest of the system, each torque margin relay 14 is rendered inoperative to control the associated speed of the associated generator 2 which is operating asynchronously with respect to the other generators.

With an electric ship propulsion control of this type, the operator can maneuver the ship without any concern of the synchronism between the motor and the generators or of the synchronism between the different generators. The proper division of load between the several generators occurs automatically, and the operator regulates the torque of the electric drive entirely by controlling the excitation of the exciter.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In an electric drive, an electric motor, a synchronous generator supplying current to said motor, a prime mover driving said generator, means for varying the excitation of said generator, and means for varying the torque of said prime mover in accordance with the relationship existing between the actual output of said generator and the maximum output obtainable therefrom with the same field excitation of said generator.

2. In an electric drive, an electric motor, a synchronous generator supplying current to said motor, a prime mover driving said generator, means for varying the excitation of said generator, and means for varying the torque of said prime mover so as to maintain a predetermined ratio between the actual output of said generator and the pull out torque thereof with the same field excitation.

3. In an electric drive, an electric motor, a plurality of parallel connected synchronous generators supplying current to said motor, a separate prime mover driving each generator, means for simultaneously varying the excitation of said generators, and means individual to each generator for varying the torque of the associated prime mover so as to maintain a predetermined relationship between the actual output of the generator and pull out torque thereof obtainable with the same field excitation of the generator.

4. In an electric drive, an electric motor, a plurality of parallel connected synchronous generators supplying current to said motor, a separate prime mover driving each generator, means for simultaneously varying the excitation of said generators, means for controlling the torque of each prime mover, and individual means for each generator responsive to predetermined electric conditions thereof for controlling the associated torque controlling means so as to maintain a predetermined relationship between the actual output of the generator and the pull out torque thereof under the same field excitation condition of the generator.

5. In an electric drive, a synchronous motor, a plurality of parallel connected variable speed synchronous generators supplying current to said motor, a separate prime mover driving each generator, a common exciter for said motor and generators, means for varying the voltage of said exciter, and individual means associated with each generator and responsive to predetermined electric conditions of the associated generator for controlling the torque of the associated prime mover so as to maintain a predetermined relationship between the actual output of the associated generator and the pull out torque thereof obtainable with the same field excitation.

6. In an electric drive, a synchronous motor, a plurality of parallel connected variable speed synchronous generators supplying current to said motor, a separate prime mover driving each generator, a common exciter for said motor and generators, means for varying the voltage of said exciter, individual means associated with each generator and responsive to predetermined electric conditions of the associated generator for controlling the torque of the associated prime mover so as to maintain a predetermined relationship between the actual output of the associated generator and the pull out torque thereof obtainable with the same field excitation, and means for rendering an individual means inoperative to control the torque of the associated prime mover when the associated generator is out of step with the other generators.

ERNST F. W. ALEXANDERSON